OSCILLATOR WITH LIGHT SOURCE AMPLITUDE CONTROLS

Filed Aug. 1, 1960 2 Sheets-Sheet 1

INVENTOR.
JAMES L. KIMBALL

BY Lyon & Lyon

ATTORNEYS.

OSCILLATOR WITH LIGHT SOURCE AMPLITUDE CONTROLS

INVENTOR.
JAMES L. KIMBALL

BY Lyon & Lyon

ATTORNEYS.

3,175,169

OSCILLATOR WITH LIGHT SOURCE AMPLITUDE CONTROLS

James L. Kimball, San Diego, Calif., assignor to Cohu Electronics, Inc., San Diego, Calif., a corporation of Delaware Filed Aug. 1, 1960, Ser. No. 46,465
6 Claims. (Cl. 331—141)

This invention relates to circuits for providing standard signals and, more particularly, to improvements in alternating-current signal standard equipment.

An alternating-current signal standard circuit is usually employed for providing a signal which may be used as a reference. The signal has a reference frequency, as well as a reference level. It is desirable that the reference frequency waveform be a pure sine wave and, further, if the alternating-current standard is one that delivers more than one frequency, that the output amplitude or level should be maintained constant, despite switching from one to another of these standard frequencies and also despite changes of load, or any other disturbances. This latter requirement has proven to be rather difficult to obtain. Switching between reference frequencies has required resetting the output level for each different frequency. Also, of course, load changes have effected the amplitude adversely. The required resetting is time-consuming as well as annoying. Further, it has not been possible to switch rapidly between reference frequencies at fixed amplitudes for testing purposes, with equipment made heretofore.

An object of this invention is to provide a novel circuit arrangement for an alternating-current reference standard.

Yet another object of the present invention is to provide an alternating-current reference standard wherein the selected output is maintained constant, either at a single frequency or where switching between frequencies occurs.

Still another object of this invention is to maintain the output amplitude of a reference voltage alternating-current standard generator constant, regardless of environmental changes, load or power supply variations, or other disturbances.

Yet another object of the present invention is the provision of an improved and more useful alternating-current reference standard.

These and other objects of the invention are achieved in an arrangement wherein an oscillator is employed to drive an amplifier. The output of the amplifier includes a variable attenuator means for enabling the selection of different amplitude outputs. Feedback from the output to the input of the amplifier is employed to improve the wave shape and assist in maintaining stability. A second attenuator which is coupled to be operable with the first attenuator means is employed for deriving a fixed amount of output signal, despite variations in output selected by the first attenuator means. The fixed amount of output is detected or rectified and then compared with a reference voltage. The result, comprising a difference signal, is employed to vary the feedback between the output and input of the oscillator and thereby the loop gain in a manner so that the oscillator output will vary to compensate for any variations in the fixed output derived by the second attenuator.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
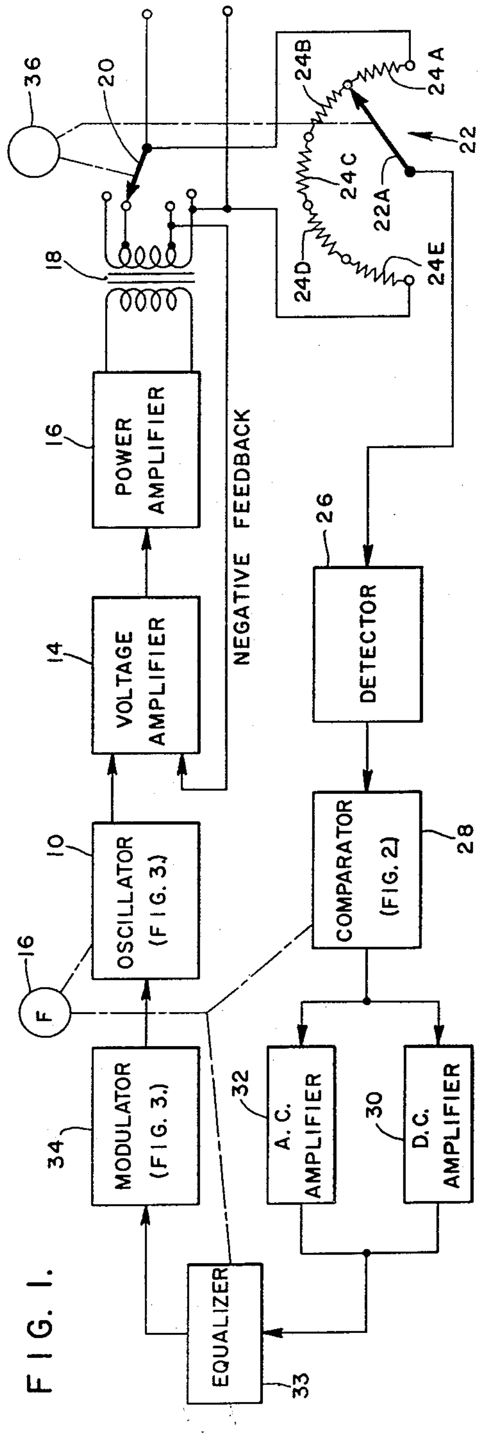
FIGURE 1 is a block diagram of an embodiment of the invention.

Referring now to FIGURE 1, there may be seen a block diagram of an embodiment of the invention. An oscillator 10 applies its output to a voltage amplifier 14. The oscillator 10 may provide several different output frequencies. These are manually selectable by actuating the knob 16. As will be shown in FIGURE 3, the oscillator is an RC-tuned oscillator, and the knob 16 selects different combinations of the resistors and capacitors for varying the frequency.

The output of the voltage amplifier 14 is applied to the power amplifier 16 for further amplification. The output of the power amplifier 16 is applied to an output transformer 18, having multiple secondary windings or a multitapped secondary winding, dependent on the types of outputs desired and for enabling a plurality of different levels of outputs to be derived therefrom. A selector switch 20 is shown by way of example of an arrangement for selecting a desired amplitude value. Other arrangements may be employed in accordance with techniques well known in the art which employ different output winding combinations of the transformer 18 for achieving different output-level signals while maintaining constant output impedance or for varying output impedances while maintaining constant output amplitudes. These arrangements are well known in the art and therefore will not be described in detail herein. For the purpose of the claims herein, these arrangements are considered as a variable attenuator.

Negative feedback is derived from the output transformer 18 and fed back to the voltage amplifier 14 for the purpose of assuring that the output signal applied to a load will be substantially free of distortion. In addition, an attenuator 22 is employed for deriving a substantially constant amplitude-sample signal from the very output of the voltage reference standard, regardless of the amplitude of the signal selected by the selector 20. This attenuator 22 is exemplified by a selector-switch arm 22A, which can be moved to select the combination of one or more of the resistors 24A through 24E. The resistor string 24A through 24E is connected across the output, and the selector arm 22A is ganged with the selector arm 20 in a manner so that, as the selector arm 20 selects a larger or smaller amplitude signal, the amplitude of the signal selected by the selector arm 22A will remain constant. Selector arm 22A is connected to a detector 26, which serves the function of rectifying the alternating-current signal. The output of the detector 26 is applied to a comparator 28, which serves the function of comparing the detected signal with a reference to provide a difference signal. The difference signal is limited in amplitude.

The difference signal is amplified by two amplifiers in parallel. One of these is a direct-coupled chopper amplifier 30; the other is an alternating-current amplifier 32. The direct-coupled amplifier 30 amplifies the frequency components in the difference signal which are up to 10 cycles per second, approximately. The alternating-current amplifier handles any frequency components in the difference signal which exceed 10 cycles per second, approximately. The outputs from the alternating-current amplifier 32 and direct-coupled amplifier 30 are combined and applied to an equalizer 33. This equalizer consists of a network for optimizing the response of the electronic servoloop, which this invention comprises, at different operational frequencies. It acts to emphasize those frequencies which secure the best mode of operation. Its use and circuitry are well known in servoloop techniques; for example, see "Basic Feedback Control Systems Design," by C. J. Savant, Jr., published by McGraw-Hill Book Company in 1958, Chapter 6. The equalizer networks are switched with each frequency selected by the frequency-selecting knob 16. The output of the equalizer 33 is fed to a modulator 34. This circuitry serves the function of controlling the oscillator from the difference signal, so that the output at the transformer 18 is maintained constant at the value selected, whether or not the oscillator frequency is changed, the output load is changed, or regardless of any other disturbances which tend to affect the output adversely. A knob 36 is used for varying simultaneously the selector 20 and the selector 22A.

Figure 2:
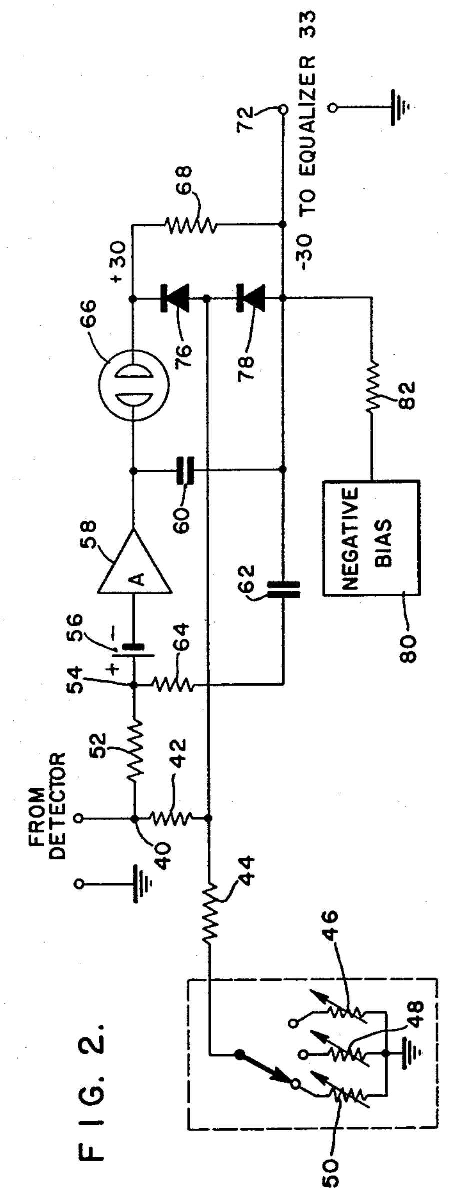
FIGURE 2 is a circuit diagram of a limiter-comparator suitable for use with the embodiment of the invention.

FIGURE 2 is a circuit diagram of a comparator circuit of a type preferred in accordance with this invention. The signal received from the detector, consisting of a substantially constant-level sample from the output of the alternating-current standard, which has been rectified, is applied to the terminal 40. This signal develops across resistor 42, which is in series with resistor 44, which is in series with a selected one of three variable resistors 46, 48, 50.

At this point it should be noted that in an embodiment of the invention which was built, the alternating-current standard delivered any one of three common power frequencies. The selection of one of these power frequencies by the control 16 shown in FIGURE 1 also selects one of the three resistors 46, 48, 50. The three variable resistors 46, 48, 50 effectively are calibration potentiometers and enable the setting of the level of the sample at each of the operating frequencies. A resistor 52 is connected to a junction 54. A standard potential cell 56 is connected between the junction 54 and the input to a combination amplifier 58. Amplifier 58 actually represents amplifiers 30, 32 shown in FIGURE 1, and that is why it is called a combination amplifier. The standard-cell potential is 1.019 volts, and it is connected in a manner to oppose the voltage provided by the detector in order to produce an amplifier-input level centered at zero.

The output of the combination amplifier 58 is connected back to the terminal 54 through a first capacitor 60. A second capacitor 62 is connected in series therewith, and a resistor 64 is connected between the second capacitor 62 and the terminal 54. A voltage drop is achieved by using a neon bulb 66, which is connected to receive the output of the amplifier 58. The neon bulb output is connected to a resistor 68, the other end of which is connected to the junction between capacitor 60 and 62, and also to an output terminal 72. A first diode 76 is also connected between the output of the neon bulb 66 and the junction of resistors 42 and 44. A second diode 78 is connected between diode 76 and the junction between capacitor 60 and 62, as well as to output terminal 72. A negative bias source 80 is connected to the diode 78 through a resistor 82.

In operation, the detector voltage is opposed to the standard-cell voltage, and the difference is amplified by the direct-current amplifier 58. The gain of the amplifier is quite high, being on the order of one million. The neon bulb 66 changes the voltage to the required output level. This signal is applied to the output terminal 72. In the event that any transient voltages occur as a result of switching, for example, there is an instant response on the part of the network shown in FIGURE 2 to compensate therefor. Should there be a decrease in the detector output, there will be a negative transient at the amplifier input which will result in the amplifier output becoming more positive. This positive transient is applied through capacitor 60 to raise the anode potential of diode 78 to render diode 78 conductive, thereby effectively raising the potential of the input terminal 40. For a steady-state positive increase, a portion thereof is fed back through resistor 68 and diode 78, back through resistor 42, to the terminal 40. As a result of the feedback network, the effects of transient signals as well as overloading are avoided. For positive transient increase in input, then diode 76 operates to feed back a negative signal to lower the input potential and to limit the amplifier excursion in response to these transients.

As pointed out, the function of the circuit shown in FIGURE 2 is to compare the detector signal with the standard-cell voltage output. Any difference is amplified by the combination amplifier 58 and applied to the succeeding equalizer, and then to a modulator. The circuitry shown in FIGURE 2 serves to control and shape the frequency response, and the diode network limits transients generated as well as effects of a temporary overload. In an embodiment of the invention which was built, the center voltage, corresponding to zero input volts to the combined amplifier 58, was −0.8 volt input to the modulator 34, and the range around this center voltage extended from −2.0 volts to +0.5 volt.

As previously indicated, combination amplifier 58 actually comprises a pair of amplifiers operating in parallel. One of these is a direct-current chopper amplifier 30, which accepts signal components from direct current up to frequencies on the order of 10 cycles. The second amplifier is an alternating-current amplifier 32 and accepts signal components on the order of 10 cycles and higher in frequency. These amplifiers comprise circuitry which is well known in the art which are available for commercial purchase, and thus will not be shown in detail here. The outputs of both amplifiers are combined after amplification, using a resistor in an output stage of common amplification (not shown).

Figure 3:
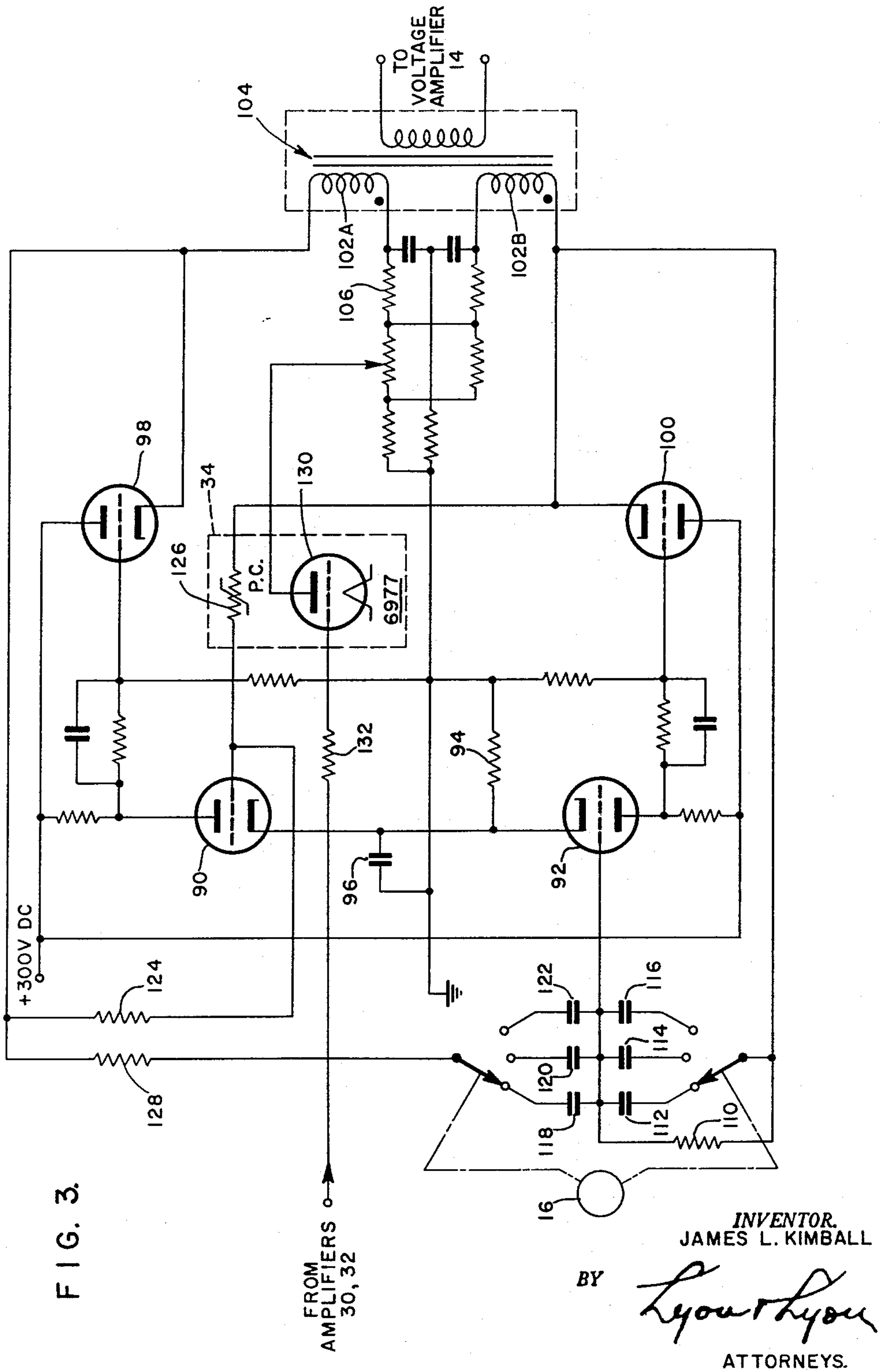
FIGURE 3 is a circuit diagram of a modulator and oscillator in accordance with this invention.

FIGURE 3 is a circuit diagram of a modulator and oscillator in accordance with this invention. The oscillator includes a first tube 90 and a second tube 92. They have a common-cathode load resistor 94, which is bypassed by a capacitor 96. The output of the tube 90 is applied to a cathode-follower tube 98. The output of the tube 92 is applied to a cathode-follower tube 100. The cathode load of cathode-follower tube 98 comprises one-half of the primary winding 102A of a transformer 104. One end of this winding 102A is connected to the cathode of the tube 98; the other end of the winding 102A is connected to a filtering network 106. The cathode load of cathode-follower tube 100 comprises the other half 102B of the primary winding. One end of this primary winding 102B is connected to the cathode of tube 100; the other half is connected to the network 106. Output to the voltage amplifier 14 is taken from the secondary winding of the transformer 104.

A loop which provides positive feedback for causing oscillations may be traced from the control grid of tube 92, through tube 92, through the cathode-follower tube 100, where a first phase inversion takes place, then through a photoconductor 126, through a tube 90, and the cathode follower 98, wherein a second phase inversion takes place, and then back to the control grid of tube 92, through a resistor 128, which is connected in series with a capacitor (either 118, 120, or 122).

A negative feedback path is provided for each of the tubes 90, 92. For tube 90 this comprises a connection from the cathode of tube 98, through resistor 124, to the control grid of tube 90. For tube 92 this comprises a connection from the cathode of tube 100, through a parallel connected resistor 110 and capacitor (either 112, 114, or 116), to the control grid of tube 92. Selection of one of capacitors 112, 114, 116 and one of capacitors 118, 120, or 126 is made by the control 16 (see FIGURE 2). The one of the three capacitors which is selected is determined by the desired frequency of oscillation. Sufficient feedback for achieving oscillation is assured by selecting the values of these resistors and capacitors so that there is more positive feedback than negative feedback. As previously pointed out, oscillation of this amplifier is assured by selecting the values of the positive feedback network to assure that the amount of positive feedback to the tube 90 is greater than the amount of negative feedback to both tubes. The common-cathode load between tubes 90 and 92 is for purposes of bias.

Effectively, with the circuitry described, there are substantially three conditions in which the oscillator can be placed. The first of these is one wherein the value of the photoconductor resistance is so high that the loop gain of the oscillator is less than one and any oscillations of the oscillator would die out. This however, it should be understood, is not an instantaneously occurring state into which the oscillator is driven from an oscillating state, but one which requires a finite amount of time. Therefore, when oscillations begin to die out, an error signal develops which can correct this situation.

A second condition is one wherein the value of the photoconductor resistance is low, so that loop gain of the oscillator is somewhat greater than one, and the oscillator oscillates at saturation. Under these conditions an error signal is developed which changes the value of the photoconductor, which brings the loop gain back to a value to maintain proper oscillation.

The third condition is the one wherein the value of the photoconductor resistance is sufficient to maintain loop gain at one. This corresponds to oscillation between the two extremes mentioned above. It should be noted that actual practical operating experience with embodiments of the invention which have been built and operated proves that neither of the first two conditions occur. Instead, operation occurs around and at the third condition. Some departure toward the first and second conditions from the third condition does occur, but the active time constants of the system are such that these departures are very rapidly corrected, and the system is returned to the third condition.

With the type of operation briefly described, the amplitude of the output of the oscillator is continuously controlled. Thus, the amplitude of the oscillations which are obtained is controlled by the resistance of the photoconductor 126. This, in turn, is varied by the difference signal which is applied to a variable light source 130. This variable light source comprises a tube, such as the type manufactured and sold under the designation 6977 by Amperex Co., and also Tung-Sol Co. It includes a control grid to which the signal from the amplifiers 30, 32 is applied through the resistor 132. The intensity of the illumination is determined by the amplitude of this signal on the control grid. The light source 130 is positioned so that its illumination falls on the photoconductor to establish or control the resistace thereof.

The control loop for the system is now closed. As described, it comprises an arrangement for comparing a fixed sample of the output which is maintained substantially the same, regardless of the amplitude of the output taken from the system. This standard is compared with a voltage-reference standard, and any deviation is employed to vary the gain of the feedback loop in the oscillator, whereby its output is controlled in a manner to compensate for any deviation of the sample voltage from what it should be.

The circuit for achieving positive and negative feedback for the oscillator will be recognized as a Wien bridge circuit, wherein the frequency "*f*" is equal to $$\frac{1}{2\pi \times \sqrt{r1c1r2c2}}$$

*r*1 comprises resistor 124; *r*2 comprises resistor 110; *c*1 comprises any one of capacitors 118 through 122; and *c*2 comprises any one of capacitors 112 through 116. Thus, it will be apparent that the frequency of the oscillator will remain constant, despite variations in the resistance of the photoconductor 126.

It should now be apparent that when a switch is made from one to the other of the different frequencies (here exemplified by 3) which the oscillator is capable of producing, or when load changes occur, etc., the fed-back sample signal insures that the output of the oscillator remains at the value which has been selected and is not affected by a change in the oscillation frequency, power-supply variations, and the like.

There has accordingly been shown and described herein a novel and useful alternating-current voltage standard oscillator system. In embodiments of the invention which have been built and tested, absolute voltage accuracy of 0.1 percent is obtained, regardless of load variations, power supply variations, or switching between frequencies. The reference standard provides an output which is adjustable from 1 to 501 volts R.M.S. A.C. in 0.1 volt steps for frequencies of 60, 400, and 1000 cycles per second.

I claim:

1. An alternating-current standard oscillator comprising a variable oscillator including an input, an output, feedback resistance means coupled between said input and output for providing feedback, amplifier means having an input and an output, means for coupling said amplifier means input to said oscillator output for amplifying said oscillator output, means for feeding a portion of the output of said amplifier means to its input as negative feedback, detector means coupled to said output of said amplifier means for rectifying a second portion of said amplifier means output, means for establishing a reference voltage, means coupled to said detector means and said reference voltage means for comparing said rectified output with said reference voltage to derive a difference signal, and means coupled to said comparing means and responsive to said difference signal for varying the resistance value of said feedback resistance means for maintaining said variable-oscillator output amplitude constant despite variations in frequency.

2. An alternating-current standard oscillator as recited in claim 1 wherein said feedback resistance means includes a photoconductive cell, and said means for maintaining said variable-oscillator output amplitude constant includes light means for illuminating said photoconductive cell with an illumination which is variable responsive to said difference signal.

3. An alternating-current standard oscillator comprising a variable oscillator including an input, an output, feedback resistance means coupled between said input and output for providing feedback therebetween, amplifier means having an input and an output, means for coupling said amplifier means input to said oscillator output for amplifying said oscillator output, means for feeding a portion of the amplifier means output as negative feedback to its input, first variable attenuator means coupled to said output of said amplifier means for selectively attenuating the output of said amplifier means, second variable attenuator means coupled to the output of said first variable attenuator means and actuatable therewith for deriving as an output a predetermined portion of the output of said first variable attenuator, detector means coupled to said second variable attenuator means for rectifying said output of said second variable attenuator to provide a rectified voltage, means for establishing a reference voltage, means coupled to said detector means and said reference voltage means for comparing said rectified voltage with said reference voltage to derive a difference signal therefrom, and means coupled to said comparing means and responsive to said difference signal for varying the resistance value of said feedback resistance means for maintaining said variable-oscillator output amplitude constant.

4. An alternating-current standard oscillator as recited in claim 3 wherein said feedback resistance means includes a photoconductive cell, and said means for maintaining said variable-oscillator output amplitude constant includes light means for illuminating said photoconductive cell with an illumination which is variable responsive to said difference signal.

5. In an oscillator of the type having an input and an output, means for controlling a characteristic of the output oscillations of said oscillator comprising resistance means coupled between said oscillator output and input for applying feedback from said output to said input, said resistance means including a photoconductor, a variable light means positioned for illuminating said photoconductor for varying its resistance with variations in its illumination to thereby vary the amplitude of feedback to said oscillator input, means for establishing a voltage reference, means for deriving a predetermined portion of the output of said oscillator, means for comparing said predetermined portion of the output with said voltage reference to obtain a difference signal, and means for controlling said variable light means in response to said difference signal.

6. In an oscillator as recited in claim 5 wherein said oscillator includes a first variable attenuator coupled to the output thereof for selectively attenuating output signals therefrom, said means for deriving a predetermined portion of the oscillator output includes a second variable attenuator coupled to said first variable attenuator and actuatable with said first variable attenuator to produce said predetermined portion as an output, and said means for comparing said predetermined portion of the output with said voltage reference to obtain a difference signal includes detector means coupled to said second variable attenuator for rectifying said output thereof.

References Cited in the file of this patent

UNITED STATES PATENTS

| | | |
|---|---|---|
| 1,938,067 | Davis | Dec. 5, 1933 |
| 1,958,986 | Culver | May 15, 1934 |
| 2,930,992 | Rawlins et al. | Mar. 29, 1960 |
| 2,956,243 | Weinschel | Oct. 11, 1960 |
| 3,084,294 | Vallese | Apr. 2, 1963 |

FOREIGN PATENTS

| | | |
|---|---|---|
| 631,263 | Great Britain | Oct. 31, 1949 |